United States Patent Office 3,468,630
Patented Sept. 23, 1969

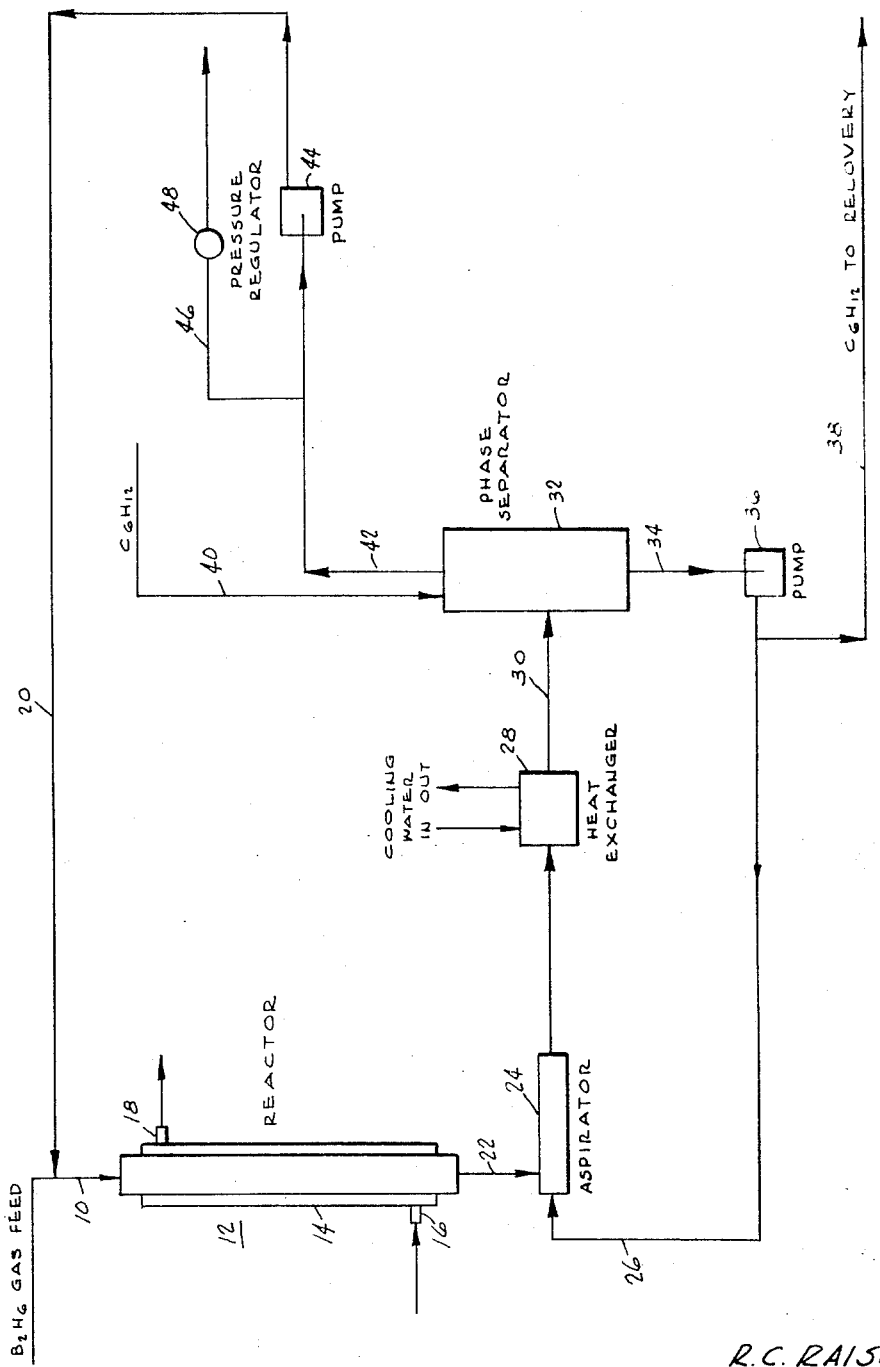

3,468,630
PREPARATION OF BOROHYDRIDES
Ralph C. Raisor and Raymond C. Rhees, Henderson, Nev., assignors, by mesne assignments, to American Potash & Chemical Corporation, a corporation of Delaware
Filed June 25, 1963, Ser. No. 290,893
Int. Cl. C01b 6/08
U.S. Cl. 23—204     3 Claims The present invention relates to the manufacture of higher boron hydrides from diborane. More particularly, it relates to the conversion by pyrolysis processes of diborane to pentaborane-9 and other desired higher boron hydrides. Pentaborane-9 and such higher boron hydrides have utility as high energy fuels.

It has been known for some time that diborane reacts, upon heating, to form various higher boron hydrides such as pentaborane-9 and decaborane. In the case of pentaborane-9, the reaction can be represented ideally by the following equation:

$$5B_2H_6 \xrightarrow{\Delta} 2B_5H_9 + 6H_2$$

In the preparation of pentaborane-9 by the pyrolysis of diborane, there are formed a number of by-product intermediate boron hydrides such as $B_4H_{10}$, $B_5H_{11}$, and others. Additionally, boron hydride polymers, typified as $(BH_x)_n$, are formed. The formation of such polymers is undesirable and must be minimized in order to achieve a high yield or rate of conversion of diborane to the desired pentaborane-9 or other higher boron hydrides.

Heretofore, in an effort to increase the yield of desired higher boron hydrides and a corresponding decrease in the production of boron polymers, it has been suggested that the diborane pyrolysis be carried out in the presence of an inert liquid solvent such as cyclohexane, cyclopentane, n-heptane, and the like. Such a pyrolysis-with-solvent process has proved to be quite satisfactory in the production of decaborane. Unfortunately, it does not provide a completely satisfactory process for the production of pentaborane-9. The reason for this lies in the nature of the solvent, the starting materials and the product produced. Thus, in such a system, the diborane starting materials and higher boron hydrides formed are soluble in the solvent. On the other hand, evolved hydrogen and boron hydride polymers are insoluble in the solvent. Thus, when practicing the process, pentaborane-9 dissolves immediately in the solvent and thereafter begins to react at once with the yet-unreacted diborane initially dissolved in the solvent. The reaction between pentaborane-9 and said diborane results in the formation of a higher boron hydride (decarborane) and polymer. If the hydrogen evolved were soluble in the solvent, its presence therein would inhibit or substantially minimize the reaction between said pentaborane-9 and the yet-unreacted diborane. So far, no completely satisfactory means has been found for preparing pentaborane-9 in a pyrolysis-with-solvent system.

Surprisingly, however, it now has been discovered that pentaborane-9 and other desired higher boron hydrides may be prepared in high yields if the diborane pyrolysis is carried out in the vapor phase. To be completely satisfactory, it is essential that the vapor phase reaction be effected at a suitably controlled reaction temperature and for a prescribed reaction time in the presence of predetermined quantities of hydrogen.

Moreover, it has been discovered that the presence of vapors of cyclohexane, cyclopentane, n-heptane, and the like in the diborane-hydrogen feed gas favors the formation of low molecular weight boron hydrides, viz, lower than decarborane, and increases the rate of conversion of diborane to such boron hydrides.

Broadly, this invention is carried out, in accordance with one of its preferred modes of operation, by introducing the proper mixture of diborane, hydrogen and cyclohexane or the like into a reaction zone and holding it therein at a predetermined temperature for a prescribed reaction time sufficient to form favorable product distribution and then quenching the reaction. Any boron hydrides formed in the reaction, before the formation of pentaborane-9 in the chain of pyrolysis reactions, may be separated from the quenched product and recycled to the reactor feed stream for further pyrolysis. It has been determined that quenching of the reaction may be achieved in plant scale units by intimately contacting the gases leaving the reactor with a cold inert solvent.

For a more complete understanding of this invention, reference is made to the following description taken in conjunction with the accompanying drawing which is a schematic illustration of one form of apparatus in which the diborane pyrolysis may be carried out.

As shown on the drawing, diborane is fed initially through line 10 into a reactor 12. The reactor may be formed of any material inert with respect to diborane including, for example, stainless steel, glass, or the like. Heat is supplied to the reactor in any convenient manner as, for example, by a surrounding jacket 14 filled with hot oil which enters through inlet 16 and exits through outlet 18.

A mixed gas stream comprising hydrogen, vaporous cyclohexane or the like and vaporous low molecular boron hydrides also are introduced into the reactor through line 20. The resulting mixed gas streams entering reactor 12 through lines 10 and 20 are heated and retained in the reactor at a temperature and for a period of time sufficient to permit the pyrolysis of the diborane to proceed to a point at which the desired higher boron hydride, e.g., pentaborane-9, is formed.

The gases exiting from the reactor through line 22 enter an aspirator 24 in which they are cooled by a stream of cold liquid cyclohexane entering through line 26. The cold cyclohexane quenches the pyrolysis reaction and prevents the pentaborane-9 or other desired higher boron hydride from reacting with yet-unreacted diborane to form undesired higher boron hydrides, viz., decaborane or boron polymer.

It will be understood, of course, that the cold liquid cyclohexane introduced into the aspirator absorbs heat from the gases in the course of quenching the same. Therefore, the liquid gas mixture leaving the aspirator is passed through a heat exchanger 28 to cool the liquid cyclohexane to make certain that the pentaborane-9 dissolved therein does not react further with dissolved diborane to form higher boron hydrides.

The liquid-gas mixture then is conveyed through line 30 to a phase separator 32 in which the liquid component of the mixture is allowed to separate from the gases. The liquid component comprises a cyclohexane solution of pentaborane-9 containing small quantities of diborane, tetraborane, pentaborane-11, decaborane and boron polymer.

The gas component comprises primarily hydrogen and diborane. Since the gas-liquid mixture is in equilibrium in the phase separator, the gas component necessarily also will contain minor amounts of tetraborane, pentaborane-9 and pentaborane-11.

Searated liquid is withdrawn from the phase separator 32 through line 34 and is pumped by pump 36 through line 26 and back to the aspirator 24 where it quenches further quantities of gases undergoing pyrolysis in reactor 12. Approximately 10% by weight of the liquid is withdrawn through line 38 and sent to a product recovery station, not shown, wherein the pentaborane-9 is stripped from the cyclohexane. The cyclohexane thus recovered is recycled to the phase separator through line 40 together with cyclohexane make up, as needed.

The gases leave separator 32 through line 42 and are pumped by pump 44 back through line 20 and into reactor 12. A portion of the gas is bled off from the system through line 46 by means of pressure regulator 48. The diborane present in the gas is recovered by absorption in cold liquid cyclohexane in a recovery vessel, not shown, and reintroduced through line 40 into the phase separator.

This invention has been carried out at a number of different temperatures, for example, less than 200° C., 200° C., 225° C., and 240° C., both with and without cyclohexane. The diborane feed rates and the recycle rates were varied to obtain desired changes in hydrogen concentration and reactor retention time. In all cases, the pressure was maintained at one atmosphere. In those instances were cyclohexane was not present, the pyrolysis reaction was quenched by rapid cooling at −78° C. Table I sets forth data of seven pyrolysis runs made at temperatures less than 200° C.

Three runs were made at a temperature of 225° C. The data from these runs is set forth in Table III.

TABLE III

|  | Example | | |
|---|---|---|---|
|  | 18 | 19 | 20 |
| Reactor temperature (° C.) | 225 | 225 | 225 |
| Condenser temperature (° C.) | −78 | −78 | −78 |
| $B_2H_6$ feed rate (ml./min.) | 30.9 | 12.6 | 13.5 |
| System pressure (mm. Hg.) | 720 | 721 | 712 |
| Recycle ratio | 37.9 | 37.3 | 17.8 |
| $H_2$:$B_2H_6$ Ratio | 3.04 | 4.26 | 5.2 |
| $H_2$ in reactor feed (mole percent) | 75.3 | 81.0 | 83.8 |
| Reactor retention time (sec.) | 1.47 | 3.66 | 10.0 |
| $B_2H_6$ conversion (percent) | 70.5 | 72.9 | 76.7 |
| Product distribution (wt. percent): |  |  |  |
| $B_4H_{10}$ | 2.4 | 7.2 | 1.0 |
| $B_5H_9$ | 74.4 | 81.8 | 81.7 |
| $B_5H_{11}$ | 9.8 | 2.0 | 2.7 |
| $B_{10}H_{14}$ | 12.3 | 8.1 | 12.7 |
| $(BH)_x$ | 1.0 | 1.0 | 1.9 |
| Ratios: |  |  |  |
| $B_4H_{10}$:$B_5H_9$ | 0.032 | 0.088 | 0.012 |
| $B_5H_9$:($B_4H_{10}$ plus $B_5H_{11}$) | 6.1 | 8.9 | 2.2 |
| $B_5H_9$:($B_{10}H_{14}$ plus polymer) | 5.6 | 9.0 | 5.6 |

The data in Table III illustrates that higher pentaborane-9 yields are obtained at 225° C. than at lower temperatures. Using a hydrogen concentration of about 82%

TABLE I

|  | Example | | | | | | |
|---|---|---|---|---|---|---|---|
|  | 1 | 2 | 3 | 4 | 5 | 6 | 7 |
| Reactor temperature (° C.) | 110 | 125 | 150 | 150 | 150 | 160 | 176 |
| Condenser temperature (° C.) | −78 | −78 | −78 | −78 | −78 | −78 | −78 |
| $B_2H_6$ feed rate (ml./min.) | 13.3 | 26.4 | 28.6 | 15.7 | 17.1 | 46.7 | 19.9 |
| System pressure (mm. Hg.) | 719 | 732 | 720 | 713 | 724 | 715 | 719 |
| Recycle ratio | 26.6 | 29.5 | 27.9 | 12.7 | 11.7 | 17.3 | 41.2 |
| $H_2$:$B_2H_6$ ratio | 0.151 | 0.044 | 0.08 | 0.23 | 0.67 | 0.17 | 0.17 |
| $H_2$ in reactor feed (mole percent) | 13.2 | 4.2 | 7.4 | 18.9 | 40.0 | 15.7 | 37.7 |
| Reactor retention time (sec.) | 3.6 | 2.8 | 2.5 | 10.1 | 10.2 | 2.2 | 2.2 |
| $B_2H_6$ conversion (percent) | 1.3 | 0.21 | 12.2 | 16.6 | 35.0 | 11.2 | 38.2 |
| $C_6H_{12}$ feed rate (mg./min.) |  |  |  |  | 79 |  |  |
| Product distribution (wt. percent): |  |  |  |  |  |  |  |
| $B_4H_{10}$ | 44.2 | 20.9 | 13.0 | 18.8 | 9.7 | 6.5 | 10.5 |
| $B_5H_9$ | 0 | 0 | 0 | 0 | 3.5 | 0 | 0 |
| $B_5H_{11}$ | 55.8 | 79.1 | 87.0 | 80.2 | 87.1 | 93.5 | 89.5 |
| $B_{10}H_{14}$ | 0 | 0 | 0 | 0 | 0 | 0 | 0.1 |
| Polymer | 0 | 0 | 0 | 0 | 0.3 | 0 | 0 |
| Ratios: |  |  |  |  |  |  |  |
| $B_4H_{10}$:$B_5H_9$ | ∞ | ∞ | ∞ | ∞ | 2.8 | ∞ | ∞ |
| $B_5H_9$:($B_4H_{10}$ plus $B_5H_{11}$) | 0 | 0 | 0 | 0 | 0.036 | 0 | 0 |
| $B_5H_9$:($B_{10}H_{14}$ plus polymer) |  |  |  |  | 11.7 |  |  |

The data in Table I illustrates that only one run (Example 5) carried out at 150° C. and a retention time of 10.2 seconds resulted in the production of any pentaborane-9.

Ten runs were made, in accordance with this invention, at a temperature of 200° C. The results of those runs are set forth in Table II.

and retention times varying from 3.7 to 10.0 seconds, pentaborane-9 yields of greater than 80 weight percent are obtainable.

TABLE II

|  | Short retention times | | | | Optimum retention Times | | | | | |
|---|---|---|---|---|---|---|---|---|---|---|
| Example | 8 | 9 | 10 | 11 | 12 | 13 | 14 | 15 | 16 | 17 |
| Reactor temperature (°C.) | 200 | 200 | 200 | 200 | 200 | 200 | 200 | 200 | 200 | 200 |
| Condenser temperature (° C.) | −78 | −78 | −78 | −78 | −78 | −78 | −78 | −78 | −78 | −78 |
| $B_2H_6$ feed rate (ml./min.) | 47.5 | 21.9 | 13.2 | 31.9 | 25.5 | 39.2 | 49.0 | 19.5 | 15.1 | 10.6 |
| System pressure (mm. Hg.) | 713 | 719 | 715 | 722 | 713 | 717 | 720 | 719 | 716 | 717 |
| Recycle ratio | 18.2 | 46.1 | 84.8 | 15.2 | 12.5 | 5.7 | 4.2 | 11.2 | 7.9 | 20.8 |
| $H_2$:$B_2H_6$ ratio | 1.13 | 1.85 | 2.62 | 1.50 | 1.70 | 1.10 | 1.10 | 1.99 | 2.00 | 2.56 |
| $H_2$ in reactor feed (mole percent) | 53.0 | 65.0 | 72.0 | 59.5 | 63.0 | 52.0 | 52.6 | 67.0 | 67.0 | 72.0 |
| Reactor retention time (sec.) | 2.1 | 1.8 | 1.6 | 3.7 | 5.7 | 8.1 | 8.7 | 8.2 | 15.2 | 10.7 |
| $B_2H_6$ conversion percent | 50.9 | 60.8 | 66.2 | 54.1 | 43.3 | 46.9 | 62.3 | 53.1 | 57.4 | 56.8 |
| Product distribution (wt. percent): |  |  |  |  |  |  |  |  |  |  |
| $B_4H_{10}$ | 10.7 | 12.1 | 8.9 | 12.3 | 8.5 | 10.3 | 8.0 | 5.5 | 8.9 | 7.9 |
| $B_5H_9$ | 40.8 | 31.0 | 20.8 | 37.8 | 59.4 | 54.3 | 51.0 | 61.4 | 56.8 | 65.0 |
| $B_5H_{11}$ | 42.7 | 56.4 | 69.8 | 42.1 | 24.3 | 22.8 | 23.0 | 20.2 | 13.4 | 13.4 |
| $B_{10}H_{14}$ | 1.5 | 0.4 | 0.1 | 6.4 | 6.8 | 11.6 | 16.1 | 12.5 | 19.3 | 12.4 |
| Polymer | 4.3 | 0.1 | 0.4 | 1.4 | 1.0 | 1.1 | 1.9 | 0.4 | 1.6 | 1.4 |
| Ratios: |  |  |  |  |  |  |  |  |  |  |
| $B_4H_{10}$:$B_5H_9$ | 0.26 | 0.39 | 0.43 | 0.33 | 0.14 | 0.18 | 1.15 | 0.09 | 0.16 | 0.12 |
| $B_5H_9$:($B_4H_{10}$ plus $B_5H_{11}$) | 0.76 | 0.45 | 0.26 | 0.69 | 1.8 | 1.6 | 1.6 | 2.4 | 2.5 | 3.1 |
| $B_5H_9$:$B_{10}H_{14}$ plus polymer | 7.0 | 62.0 | 42.0 | 4.8 | 7.6 | 4.3 | 2.8 | 4.8 | 2.7 | 4.7 |

The data in Table II illustrates that at a temperature of 200° C. the optimum retention time for maximum pentaborane-9 production was 5 to 15 seconds.

Eight runs were made, in accordance with this invention, at a temperature of 240° C. The results of those runs are set forth in Table IV.

TABLE IV

|  | Example | | | | | | | |
|---|---|---|---|---|---|---|---|---|
|  | 21 | 22 | 23 | 24 | 25 | 26 | 27 | 28 |
| Reactor temperature (° C.) | 240 | 240 | 240 | 240 | 240 | 240 | 240 | 240 |
| Condenser temperature (° C.) | −78 | −78 | −78 | −78 | −78 | −78 | −78 | −45 |
| $B_2H_6$ feed rate (ml./min.) | 12.4 | 11.2 | 12.2 | 12.2 | 13.3 | 10.9 | 9.5 | 13.2 |
| System pressure (mm. Hg.) | 716 | 717 | 717 | 717 | 720 | 718 | 714 | 718 |
| Recycle ratio | 20.2 | 32.0 | 16.3 | 50.4 | 71.4 | 9.5 | 26.8 | 69.7 |
| $H_2$:$B_2H_6$ ratio | 6.1 | 5.1 | 5.6 | 6.8 | 5.7 | 5.5 | 7.3 | 5.5 |
| $H_2$ in reactor feed (mole percent) | 86.0 | 82.6 | 84.8 | 87.2 | 85.0 | 85.0 | 88.0 | 85.0 |
| Reactor retention time (sec.) | 9.5 | 7.0 | 8.4 | 2.3 | 1.8 | 16.1 | 6.6 | 1.8 |
| $B_2H_6$ conversion (percent) | 84.0 | 70.7 | 80.6 | 80.6 | 76.0 | 78.6 | 80.0 | 82.0 |
| Product distribution (wt. percent): | | | | | | | | |
| $B_4H_{10}$ | 0.5 | 0.8 | 3.8 | 2.7 | 2.4 | 0.3 | 0.0 | 0.1 |
| $B_5H_9$ | 83.9 | 78.1 | 79.7 | 81.9 | 84.2 | 81.1 | 87.0 | 82.2 |
| $B_5H_{11}$ | 0.0 | 0.7 | 1.4 | 0.6 | 7.6 | 0.0 | 0.0 | 1.7 |
| $B_{10}H_{14}$ | 13.5 | 17.8 | 12.3 | 12.1 | 3.8 | 11.8 | 7.0 | 13.4 |
| Polymer | 3.1 | 2.6 | 2.8 | 2.8 | 2.0 | 6.7 | 6.0 | 2.6 |
| Ratios: | | | | | | | | |
| $B_4H_{10}$:$B_5H_9$ | 0.006 | 0.010 | 0.048 | 0.033 | 0.029 | 0.004 | 0.0 | 0.001 |
| $B_5H_9$:($B_4H_{10}$ plus $B_5H_{11}$) | 167.0 | 52.1 | 15.32 | 24.8 | 8.42 | 270.3 | 0.0 | 45.7 |
| $B_5H_9$:($B_{10}H_{14}$ plus polymer) | 5.05 | 3.83 | 5.28 | 5.49 | 14.51 | 2.84 | 6.69 | 5.14 |

The data in Table IV illustrates that increasing the temperature of pyrolysis to 240° C. had little effect on increasing pentaborane-9 concentration in the reactor products. The average pentaborane-9 concentration at 240° C. was 82.3 weight percent as compared to 81.8 weight percent for optimum retention times at 225° C. While little benefit is gained at 240° C. as far as pentaborane-9 production is concerned, the ratios of desired product to other boron hydrides were more favorable than they are when carried out at 225° C. (Table III). The data further show that the most favorable conditions for producing pentaborane-9 are a reactor retention time of about nine seconds and a reactor feed gas containing about 85% hydrogen.

A number of runs were made having cyclohexane vapors present in the reactor feed gas. Comparable runs were made without cyclohexane. The results of these runs are set forth in Table V. Examples 29, 31, 33 and 35 contained cyclohexane. Examples 30, 32, 34 and 36 did not contain cyclohexane.

TABLE V

|  | Example | | | | | | | |
|---|---|---|---|---|---|---|---|---|
|  | 29 | 30 | 31 | 32 | 33 | 34 | 35 | 36 |
| Reactor temperature (° C.) | 150 | 150 | 200 | 200 | 200 | 200 | 240 | 240 |
| Condenser temperature (° C.) | −78 | −78 | −78 | −78 | −78 | −78 | −78 | −78 |
| $B_2H_6$ Feed rate (ml./min.) | 17.1 | 15.7 | 17.2 | 19.5 | 22.2 | 10.6 | 15.0 | 9.5 |
| System pressure (mm. Hg.) | 724 | 713 | 719 | 719 | 717 | 717 | 717 | 714 |
| $H_2$ in reactor feed gas (mole percent) | 40 | 18.9 | 68 | 67 | 72 | 72 | 86 | 88 |
| Reactor retention time (sec.) | 10.2 | 10.1 | 8.3 | 8.2 | 9.2 | 10.7 | 6.4 | 6.6 |
| $B_2H_6$ conversion (percent) | 35 | 16.6 | 70 | 53 | 76 | 57 | 80 | 80 |
| Cyclohexane feed rate (mg./min.) | 79 | 0.0 | 52 | 0.0 | 46 | 0.0 | 62 | 0.0 |
| Product distribution (wt. percent): | | | | | | | | |
| $B_4H_{10}$ | 9.7 | 18.8 | 28.9 | 5.5 | 13.6 | 7.9 | 1.5 | 0.0 |
| $B_5H_9$ | 3.5 | 0.0 | 50.9 | 61.4 | 56.2 | 65.0 | 88.2 | 87.0 |
| $B_5H_{11}$ | 87.1 | 80.2 | 12.6 | 20.2 | 29.1 | 13.4 | 0.6 | 0.0 |
| $B_{10}H_{14}$ | 0.0 | 0.0 | 6.7 | 12.5 | 0.6 | 12.4 | 7.3 | 7.0 |
| $(BH)_x$ | 0.3 | 0.0 | 0.9 | 0.4 | 0.5 | 1.4 | 2.4 | 6.0 |
| Ratios: | | | | | | | | |
| $B_4H_{10}$:$B_5H_9$ | 2.8 | 0.0 | 0.57 | 0.09 | 0.24 | 0.12 | 0.017 | 0.0 |
| $B_5H_9$:($B_4H_{10}$ plus $B_5H_{11}$) | 0.036 | 0.0 | 1.2 | 2.4 | 1.3 | 3.1 | 42.0 | 0.0 |
| $B_5H_9$:($B_{10}H_{14}$ plus polymer) | 11.7 |  | 6.7 | 4.8 | 51.0 | 4.7 | 9.1 | 6.7 |

The data set forth in Table V illustrates that the product distribution is effected by the presence of cyclohexane in the feed gases for reactor temperatures up to at least 240° C. At 240° C., the only effect was that of lowering the polymer concentration. At 200° C., conditions favor the production of tetraborane over that of the other boron hydrides. At 150° C., conditions favor the production of pentaborane-9 and pentaborane-11. At 240° C., cyclohexane has no effect on any of the products except the polymer, which is reduced less than one-half its normal amount.

While the invention has been described with respect to what are considered to be the preferred embodiments of this invention, it will be understood, of course, that certain changes, modifications, substitutions, and the like may be made therein without departing from its true scope.

What is claimed is:

1. A process for converting diborane to a higher boron hydride which comprises heating a gaseous mixture of diborane, hydrogen and vapor selected from the group consisting of cyclohexane, cyclopentane and n-heptane to a temperature within the range of from about 200° C. to about 240° C. for a period of from about 3.7 to about 15 seconds in a closed reaction zone to form pentaborane-9 and immediately thereafter cooling the resulting gaseous mixture to reduce the rate of reaction of diborane to a higher boron hydride.

2. A process for converting diborane to pentaborane-9 which comprises heating a vaporous mixture of diborane, hydrogen and an inert gas selected from the group consisting of cyclohexane, cyclopentane and n-heptane to a temperature within the range of from about 200° C. to about 240° C. for a period of from about 3.7 to about 15 seconds in a reaction zone to form pentaborane-9, and immediately thereafter quenching the resulting gaseous reaction mixture to reduce the rate of formation of higher boron hydrides by contacting said mixture with a quantity of a cold, liquid inert solvent selected from the group consisting of cyclohexane, cyclopentane and n-heptane.

3. A process for converting diborane to a higher boron hydride which comprises introducing diborane into contact with a moving stream of a hot, vaporous inert gas and hydrogen, maintaining the resulting gaseous mixture at a temperature within the range of from about 200° C. to about 240° C. for a period of from about 3.7 to about 15 seconds to convert the diborane to pentaborane-9, quenching the resulting stream of hot gases with a moving stream of a cold, liquid inert solvent, separating unreacted diborane and recycling it while recovering the pentaborane-9, said inert gas and said inert liquid solvent each being selected from the group consisting of cyclohexane, cyclopentane and n-heptane.

References Cited

UNITED STATES PATENTS

| | | | |
|---|---|---|---|
| 3,037,846 | 5/1962 | Mann et al. | 23—204 |
| 3,078,530 | 2/1963 | Reccardi et al. | 23—204 |
| 3,167,392 | 1/1965 | Edwards et al. | 23—204 |
| 3,169,829 | 2/1965 | Johnston et al. | 23—204 |

OTHER REFERENCES

Owens: "Journal of Applied Chemistry," vol. 10, pp. 483–493 (1960).

Schechter et al.: "Preparation of Pentaborane and the Evalutation of the Hazards of Handling Diborane and Pentaborane," Report No. MSA–9973–FR, Navy Contact NOa(s) 9973, printed December 1950, declassified May 1954, pp. 2–7 and FIGURE 1.

OSCAR R. VERTIZ, Primary Examiner

G. O. PETERS, Assistant Examiner